(12) United States Patent
Lakshminarayanan et al.

(10) Patent No.: US 7,454,413 B2
(45) Date of Patent: Nov. 18, 2008

(54) QUERY EXPRESSIONS AND INTERACTIONS WITH METADATA

(75) Inventors: Priyamvadha P. Lakshminarayanan, Bellevue, WA (US); Avner Y. Aharoni, Seattle, WA (US); Henricus Johannes Maria Meijer, Mercer Island, WA (US); David N. Schach, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 302 days.

(21) Appl. No.: 11/207,221

(22) Filed: Aug. 19, 2005

(65) Prior Publication Data

US 2007/0043702 A1 Feb. 22, 2007

(51) Int. Cl.
*G06F 17/30* (2006.01)
(52) U.S. Cl. ......................................................... 707/3
(58) Field of Classification Search ................. 707/2–5, 707/100, 200; 717/100, 114, 140
See application file for complete search history.

(56) References Cited

U.S. PATENT DOCUMENTS

| | | | | |
|---|---|---|---|---|
| 7,054,859 | B2 * | 5/2006 | Kuno et al. | 707/5 |
| 2003/0101169 | A1 * | 5/2003 | Bhatt et al. | 707/3 |
| 2004/0193575 | A1 * | 9/2004 | Chen et al. | 707/3 |
| 2004/0194057 | A1 * | 9/2004 | Schulte et al. | 717/114 |

OTHER PUBLICATIONS

Bertram Ludascher, et al. Time to Leave the Trees: From Syntactic to Conceptual Querying of XML. San Diego Supercomputer Center, U.C. San Diego. XMLDM'02, Prague. 17 pages.
XMLSpy 2005. Altova. http://www.altova.com/features_xpath.html Last accessed Aug. 19, 2005. 3 pages.

* cited by examiner

*Primary Examiner*—Cheryl Lewis
(74) *Attorney, Agent, or Firm*—Amin, Turocy & Calvin, LLP

(57) ABSTRACT

This disclosure pertains to the interaction between query expressions and metadata. Metadata, for example provided by one or more schemas, can supply information over a domain to be queried and/or navigated. This metadata can be applied to the query expression, or vice versa, to return information about the domain and/or the query expression.

20 Claims, 21 Drawing Sheets

QUERY EXPRESSIONS AND INTERACTIONS WITH METADATA

BACKGROUND

A database is a collection of data or facts organized in a systematic manner and persisted to a storage device by a database management system. The data can be structured according to a variety of methods or models. For example, a hierarchical data model associates each piece of knowledge with a record and places the records in a tree data structure such that each record is owned by only one entity. An extension of the hierarchical model is the network model that arranges the records in a graph data structure allowing for a record to have multiple parents and children. A database can also be represented using a simple flat-file model. In such a model, the information is stored in a plain text file with one record per line. XML is a popular format for storing hierarchical data. The most common model used today is the relational database model wherein mathematical relations based on set theory and predicate logic represent the data.

The organized nature of database data enables computer programs to easily and efficiently retrieve answers to questions. In particular, computer programs can create, manipulate and retrieve data from a database utilizing a query. For a relational database management system, the query can be formatted utilizing the structured query language (SQL). For example, to extract the complete customer records for all customers with the last name "Smith," the SQL query expression could be formatted like SELECT * FROM customers WHERE lastname='Smith'. In this example, the keyword SELECT indicates the query is a retrieval query, the keyword FROM specifies which table of the database the data is to be found, in this case customers, and the keyword WHERE designates that only the rows with columns matching the given parameters should be returned.

In the event that XML is utilized to store data, a different query format is employed. XML Path Language (XPath) is a language recommended by the World Wide Web Consortium (W3C) for addressing portions of an XML document. In XPath, the previous SQL example would be formatted as xmlDoc.selectNodes("//customer[lastname=Smith]"). In this example, the query returns all customer element nodes that have a lastname child node with the value "Smith." The W3C is presently developing a language called XQuery that is built on XPath. XQuery is designed to query XML data to retrieve and manipulate data from XML documents or a data source capable of being viewed as XML data.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to query expressions and their interaction with metadata related to the expression and a domain to be queried or navigated thereby. In accordance with one aspect of the subject disclosure, a query engine can apply the query expression to the metadata to extract information about the data storage model or format. By way of example and not limitation, a query expression can be specified as an XPath/XQuery path expression and the metadata can be provided by one or more schemas and/or schema definitions. In one instance, type information can be extracted and employed to type check the query expression.

According to an aspect of the subject disclosure, the information extracted by the query engine can be provided to a program support component. The program support component can provide intelligent assistance to programmers via an editor or integrated development environment. For example, type information can be employed to facilitate automatic statement completion, tool tip population, as well as error notifications, among other things.

In accordance with another aspect of the disclosed subject matter, information extracted by the query engine can be employed to aid in language mapping or translation. Type information can be provided with respect to either a source or a target programmatic element specified as a query expression to enable mapping from an element in a first language or model to the same or like type in a second language and/or programming model.

According to yet another aspect of the disclosed subject matter, updates of documents, including but not limited to XML documents, can be improved via the generation and type checking of a query expression pertaining to an alteration to be made to an instance document. In this manner, a modification can be aborted before it is applied.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
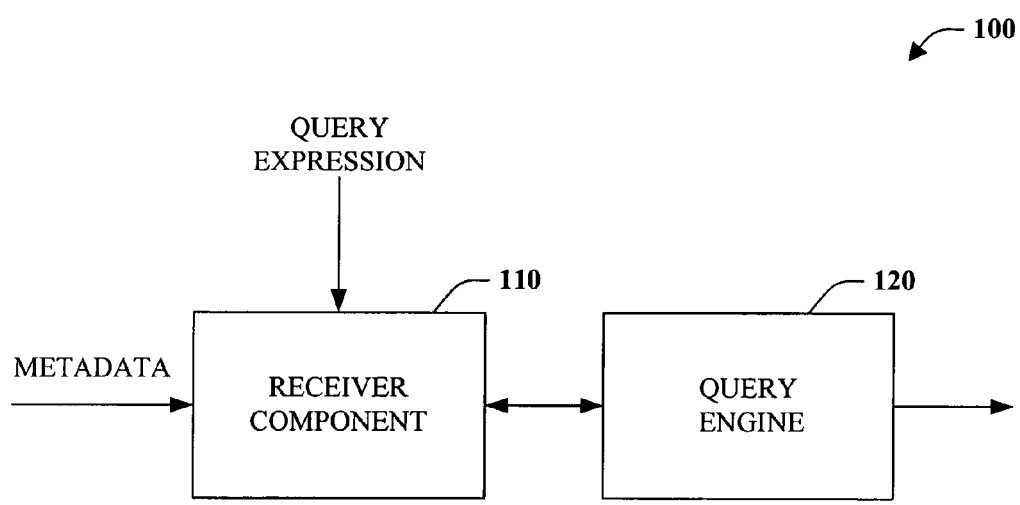
FIG. 1 is a block diagram of a query expression system.

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "engine" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

As used herein, the term "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, jump drive . . . ). Additionally, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Turning initially to FIG. 1, a query expression system 100 is illustrated in accordance with an aspect of the disclosed subject matter. Query expression system 100 includes a receiver component 110 and a query engine 120. Receiver component 110 receives, retrieves or otherwise obtains a query expression and metadata. A query expression is any question or inquiry directed toward a data source. For example, a query expression could be an XPath (or alternatively XPath/XQuery) expression over XML data or a SQL query over relational data, among other things. Metadata is data pertaining to data. The received metadata can correspond to information concerning the query expression and more particularly the domain to which the query expression is directed. The metadata can take many forms including but not limited to a schema, schema definition, an XML schema, a database schema, and a type system. Furthermore, it should be noted that metadata pertaining to a domain can be provided by one or more schemas and/or the like. Receiver component 110 is communicatively coupled to query engine 120. Query expressions and metadata are transmitted from the receiver component 110 to the query engine 120. Query engine 120 can, or is operable to, apply the metadata to the query expression or vice versa. The query engine 120 retrieves information concerning the queried domain, for example, by applying the query expression over the metadata. For example, the information can include but is not limited to type information that corresponds to the type of the result that would be returned if the query expression were executed on data or a collection thereof rather than metadata. The retrieved information can subsequently be output by query engine 120 for further utilization and/or processing.

For purposes of clarity and not limitation, consider the following XPath query example. For instance, consider the subsequent XML schema:

```
<xs:schema xmlns:tns="http://tempuri.org"
    targetNamespace="http://tempuri.org"
    xmlns:xs="http://www.w3.org/2001/XMLSchema"
    elementFormDefault="qualified">
  <xs:element name="Customer">
    <xs:complexType>
      <xs:sequence>
        <xs:element name="FirstName" type="xs:string" />
        <xs:element name="LastName" type="tns:LastNameType" />
      </xs:sequence>
      <xs:attribute name="CustID" type="xs:positiveInteger"
        use="required" />
    </xs:complexType>
  </xs:element>
</xs:schema>
```

The following is an instance document that conforms to the above schema:

```
<Customer xmlns="http://tempuri.org" CustID="1">
    <FirstName>Priya</FirstName>
    <LastName>Lakshminarayanan</LastName>
</Customer>
```

The next code sample performs a query on the instance document to locate an address element and return the search results.

```
XmlDocument doc = new XmlDocument( );
doc.Load("Customer.xml");
XmlElement rootElement = doc.DocumentElement;
XmlNamespaceManager nsManager = new XmlNamespaceManager(new
            NameTable( ));
nsManager.AddNamespace("tns", "http://tempuri.org");
XmlNode customerAddress =
rootElement.SelectSingleNode("/tns:Customer/tns:Address", nsManager);
Console.WriteLine("Customer address found: " + (customerAddress !=
        null));
```

In this instance, an address element does not exist and there is no way to detect that the XPath expression passed to "SelectSingleNode( )" will not evaluate to any node. However, since the metadata or schema attached or associated with the XML instance document does not allow an Address element to be a child of a Customer element this information can be utilized. In particular, the query expression system 100 can be employed to apply the XPath query expression over the schema. This enables the query expression to be type checked prior to execution on a set or collection of data in the XML domain. Here, it could be employed to detect that the Address element is not a child of the Customer element.

By way of example and not limitation, consider the following XML schema:

```
<xs:schema xmlns:tns="http://tempuri.org"
        targetNamespace="http://tempuri.org"
        xmlns:xs="http://www.w3.org/2001/XMLSchema"
        elementFormDefault="qualified">
    <xs:element name="Customer">
        <xs:complexType>
            <xs:sequence>
                <xs:element name="FirstName" type="xs:string" />
                <xs:element name="LastName" type="tns:LastNameType" />
            </xs:sequence>
            <xs:attribute name="CustID" type="xs:positiveInteger"
                use="required" />
        </xs:complexType>
    </xs:element>
</xs:schema>
```

If the XPath query "/tns:Customer/tns:FirstName" is applied on this schema using XPath semantics over an instance document, an empty list would result from the query engine 120. By contrast, if the same query is executed on the schema using XPath semantics over metadata, the XSD type "FirstName" would result. XPath semantics over metadata can mean that the XPath is applied as if it applied on a virtual instance document that the metadata describes where the results of the selection is a virtual instance data that is isomorphic to the metadata type.

Of course, such interaction is not specific to only XML. It can apply in other domains as well. For example, extending this to the SQL world one could write a query like "Select CustomerName From Customers." When applied over database metadata the object that corresponds to the "CustomerName" column could be returned.

Furthermore, it should be noted and appreciated that in accordance with an aspect of the subject innovation, the query expression received by the receiver component and evaluated by the query engine 120 can be the same query that is utilized to retrieve instance data from a source. In particular, the same query expressions can have different semantics when applied on an instance document/data and when they are applied to the metadata of that document/data. When applied to the instance document, the query expression can return the instance data. When the query expression is applied to metadata, it returns type information, for example. This facilitates transition between instance and metadata semantics transparently and simplifies access to the metadata thereby helping users answer questions about a type system.

Figure 2:
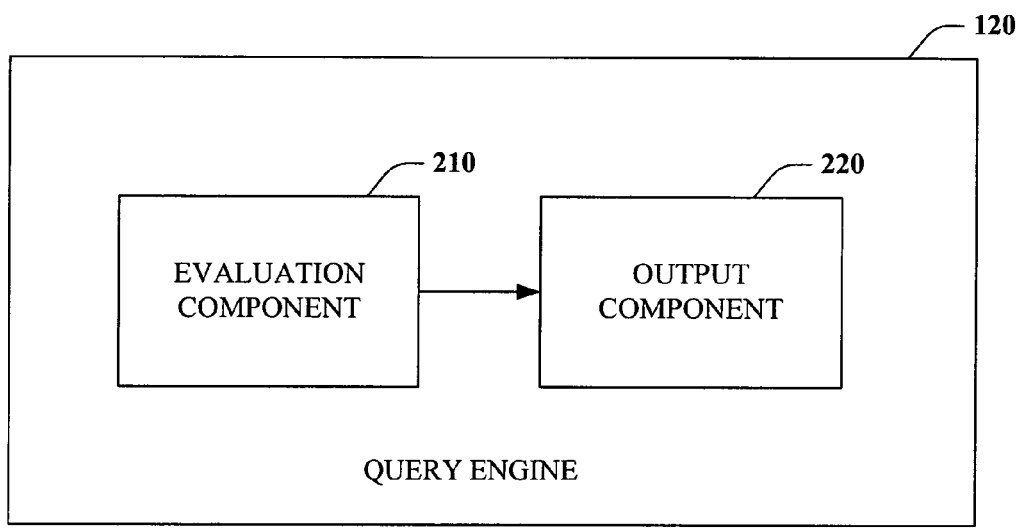
FIG. 2 is a block diagram of a query engine.

FIG. 2 is a block diagram of a query engine 120. Query engine 120 includes an evaluation component 210 and an output component 220. Evaluation component 210 applies a received query expression to metadata associated therewith. The metadata provides information concerning the data or information on which the query expression will be executed. Accordingly, information can be retrieved concerning the type, structure and relationships of a data source domain. Evaluation component 210 is communicatively coupled to output component 220. Information obtained upon evaluation by evaluation component 210 can be transmitted to the output component 220. Upon receipt of such information, output component 220 can format such information as needed and provide such formatted information to other components for receipt or retrieval. For instance, output component could generate a schema including the obtained information.

Figure 3:
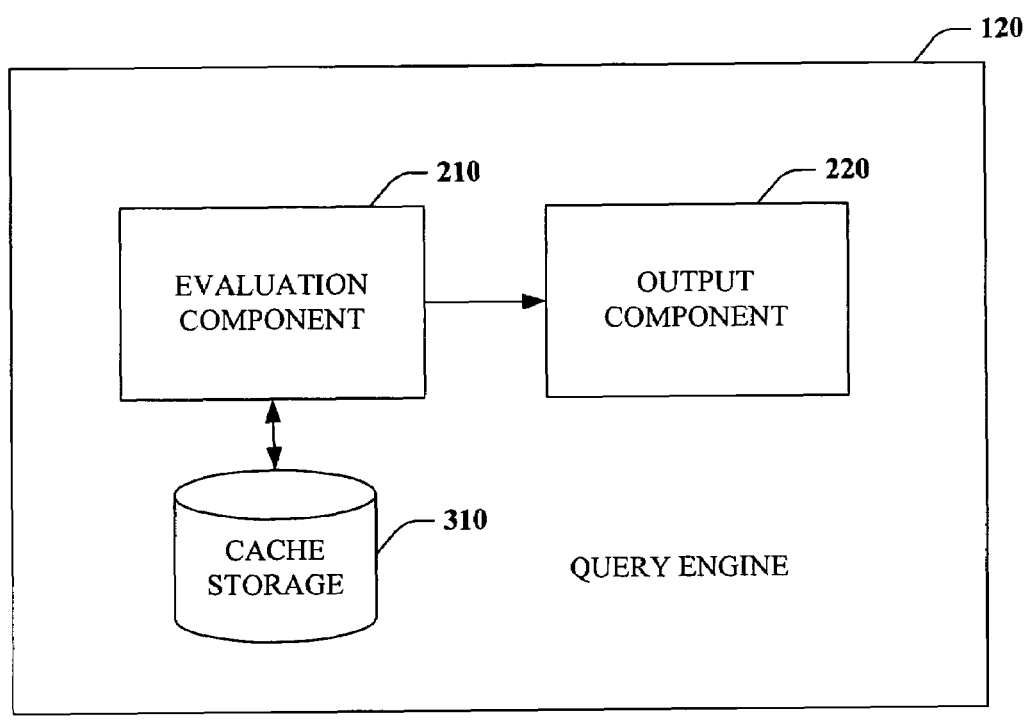
FIG. 3 is a block diagram depicting an optimized query engine.

Turning to FIG. 3, an optimized query engine 120 is illustrated. As illustrated and described in relation to FIG. 2, query engine 120 can include an evaluation component 210 and an output component 220. Evaluation component 210 can apply query expressions to metadata associated with the expression and the domain to be queried or navigated. The metadata can include information pertaining to data types, structure and relationships amongst structures, among other things. Such metadata can be but is not limited to being provided within one or more schemas or type definitions documents. The results of the application or execution of the query expression on or with respect to metadata can be provided to the output component 220. Output component 220 can format and output or make such information available for use by other components, systems, and the like. In addition to the evaluation component 210 and the output component 220, query engine 120 can include cache storage 310. Cache storage 310 can provide storage and expedite retrieval of data. Evaluation component 210 can interact with cache storage 310 to optimize evaluation of query expressions with respect to metadata. Evaluation component 210 can employ the cache storage component 310 to house query expression results with respect to particular metadata. Once the evaluation component 210 evaluates a query, the results can be stored in cache storage 310. The next time the evaluation component 210 encounters the same query expression and metadata it can simply look up the results without having to reevaluate them. It should be appreciated that cache storage can be a volatile or non-volatile device.

Figure 4:
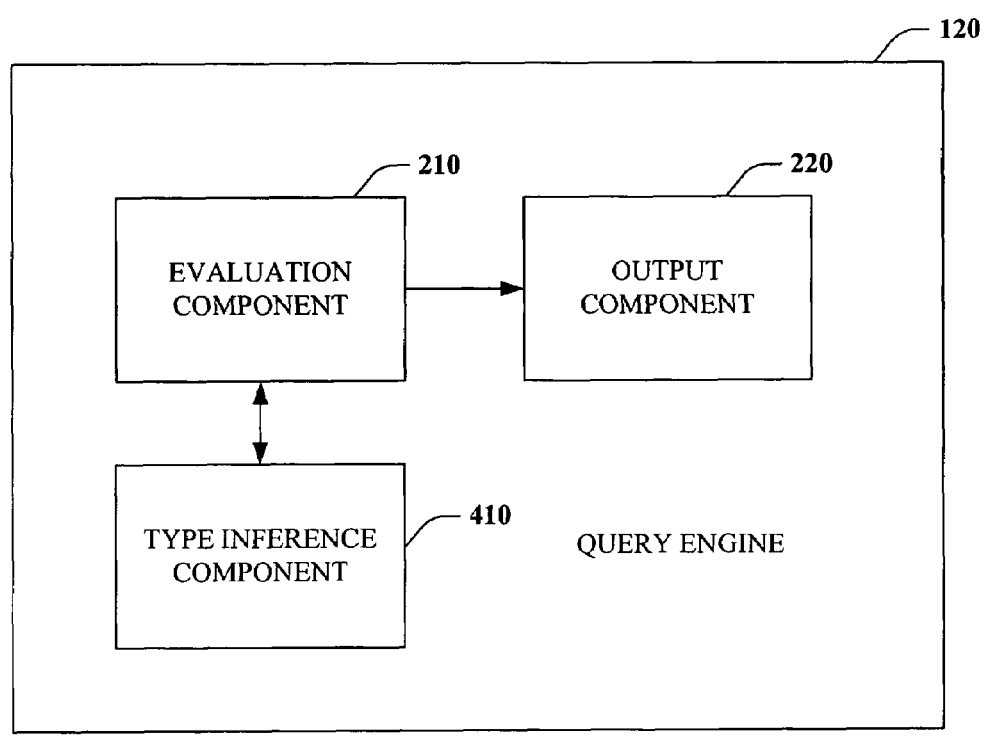
FIG. 4 is a block diagram of a query engine including a type inference component.

FIG. 4 depicts a query engine 120 in accordance with an aspect of the disclosed subject matter. Query engine 120 includes an evaluation component 210, an output component 220 and a type inference component 410. As previously described, the evaluation component 210 can evaluate or apply a query expression to metadata, perhaps from one or more schemas. Results of this evaluation can be provided to output component 220 which can format and return the results to one or more other components, systems, or the like. According to one aspect of the disclosed subject matter, the evaluation component can determine a resultant type associated with a query expression. Evaluation 210 can be communicatively coupled with type inference component 410. When applying metadata to a query expression, evaluation component 210 can interact with type inference component 410 to identify the proper type. Type inference component 410 can infer a type even when it is not explicitly provided based on context, for example.

Figure 5:
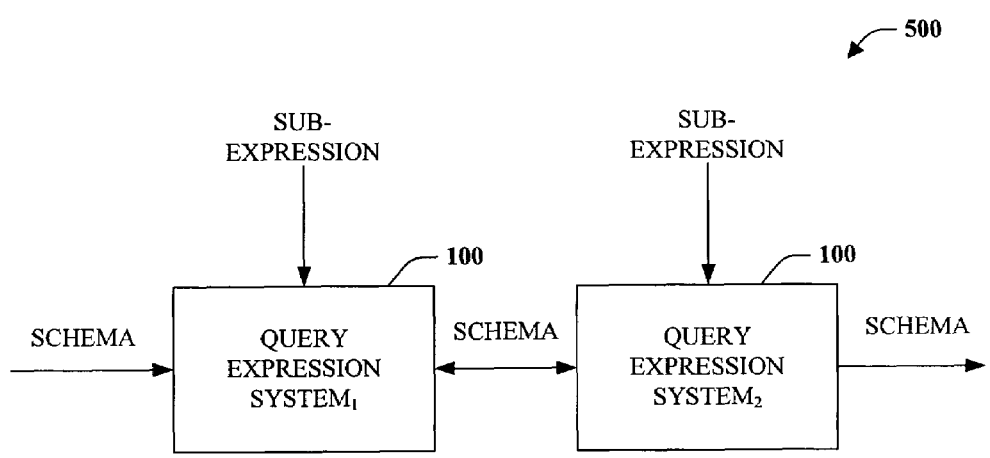
FIG. 5 is a block diagram of a system of query expression evaluation.

Turning to FIG. 5, a query evaluation system 500 is provided in accordance with an aspect of the provided subject matter. System 500 illustrates how a query expression can be evaluated incrementally or alternatively how a plurality of systems or instances thereof can be utilized to evaluate a query expression. As depicted, system 500 can include a plurality of query expression systems 100 or instances thereof to evaluate an expression including a myriad of sub-expressions queries. A first query expression system 100 can receive a schema or metadata and a sub-expression. The first query component 100 can then evaluate or apply the sub-expression query to the schema and generate a schema as output including the result. The second query expression system 100 can receive the schema and apply a second sub-expression query thereto. The result of such execution is another schema that identifies the resultant type of the expression. More concretely, consider an XPath expression of the form E1E2(/tns:Customer/tns:Address) where E1=/tns:Customer and E2=/tns:Address. The type of the expression can be determined by recursively applying an XML schema to individual sub-expressions. Here, the E1 would be evaluated by the first query expression system and E2 would be evaluated by the second query expression system utilizing a schema produced by the first.

Figure 6:
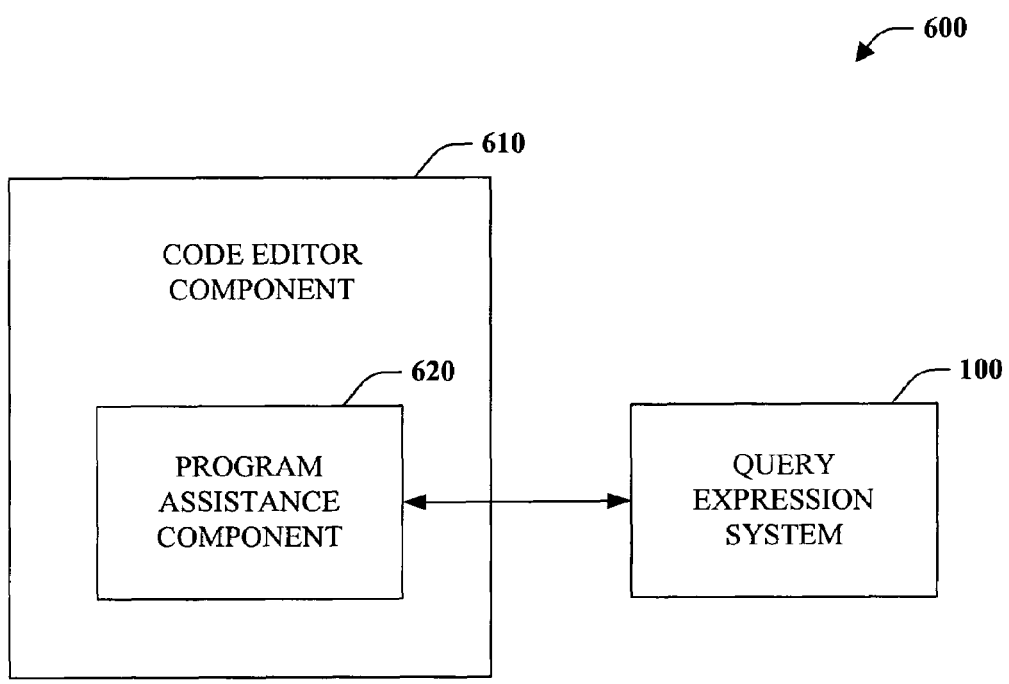
FIG. 6 is a block diagram illustrating a computer programming system.

FIG. 6 depicts a computer programming system 600. System 600 includes a query expression system 100, a code editor component 610 and a program assistance component 620. Query expression system 100 as previously described is operable to process a query expression with respect to metadata providing information about the domain to be queried. Code editor component 610 provides a mechanism to enter, open, edit, or otherwise manipulate computer-programming code (e.g., source code). Code editor component 610 can be part of an integrated development environment (IDE) and can provide or engage many services to facilitate program generation. In one instance, code editor component 610 can include a program assistance component 620. Program assistance component 620 can provide functionality including but not limited to automatic statement completion, tool tips, and error or potential error indication (e.g., debugging). For instance, suggestions can be made as a user enters code that corresponds to potential programmatic elements that would be valid based on the programmatic context. This can take the form of a drop down menu of programmatic elements that is continuously filtered based on context and entered code as the user types. A tool tip can provide, among other things, information an element type or return type, for example, upon hover of a cursor or depression of a combination of one or more select keys. Furthermore, a program can be compiled in the background and any errors or potential errors indicated, for instance by a squiggly underline in one or more colors.

Code editor component 610 and/or program assistance component 620 can interact with query expression system 100 to provide programming assistance to a user. For example, if a query expression is specified in the code such query expression can be type checked to determine the resultant type for display by a tool tip and/or to determine if such expression is valid. If the expression is invalid it can be visually denoted to the user, for instance by a red squiggly underline or the like. Additionally or alternatively, program assistance component 620 can employ query expression system to generate potential programmatic elements for automatic statement completion. By way of example and not limitation, while editing an XML document, query expression system 610 can be employed by an editor to build path expressions for a current element and subsequently evaluate or type check that expression to get back all child types of the current element. The code editor 610 could then display all possible child types in a drop down menu, for instance, to assist a user in editing the document. This is beneficial at least because misspelling of programmatic elements such as XPath expressions are common. Now, the editor 610 via program assistance component 620 can display element/attribute names in the path, for instance, based on what a user has previously entered.

Figure 7:
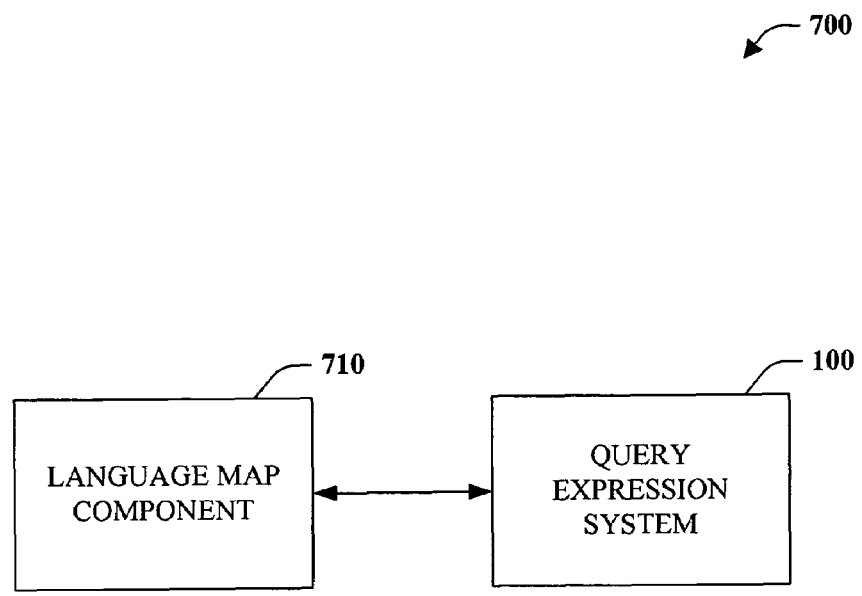
FIG. 7 is a block diagram of a language mapping system.

FIG. 7 is a programmatic mapping system 700 in accordance with an aspect of the disclosed subject matter. System 700 includes a language map component 710 and a query expression system 100 communicatively coupled to the map component 710. Language map component 710 can facilitate mapping a first programming language or model to a second programming language or model. To correctly map one language to another, the type of programmatic elements should be determined so that an element can be mapped to the same or similar type in another language. Accordingly, query expression system 100 can be employed to determine the type of a query expression and transmit the result type back to the map component 710.

For example, language map component 710 can be utilized in mapping applications (e.g., relational to XML, object to XML . . . ) where XPath is utilized to identify elements and attributes that are mapped to tables and columns. The expression query system 100 can evaluate the XPath expression with respect to a schema and generate a XML resultant schema type that can be sent to the language map component 710 to be mapped to any other type including but not limited to relation or object types. In a mapping from relational data to XML, a mapping can be defined between the element "Customer" and a "Customers" table.

<Map source="Customers" Target="/tns: Customer"/>

In this case, the query expression system 100 enables the XPath specified in the target of the map to be resolved to an XML schema type. In particular, the XPath expression can be type checked for the existence for the "Customer" type. Further, the language map component 710 can obtain this Customer XML schema type to facilitate mapping and processing associated therewith, for example for SQL generation, error validation, and the like.

Figure 8:
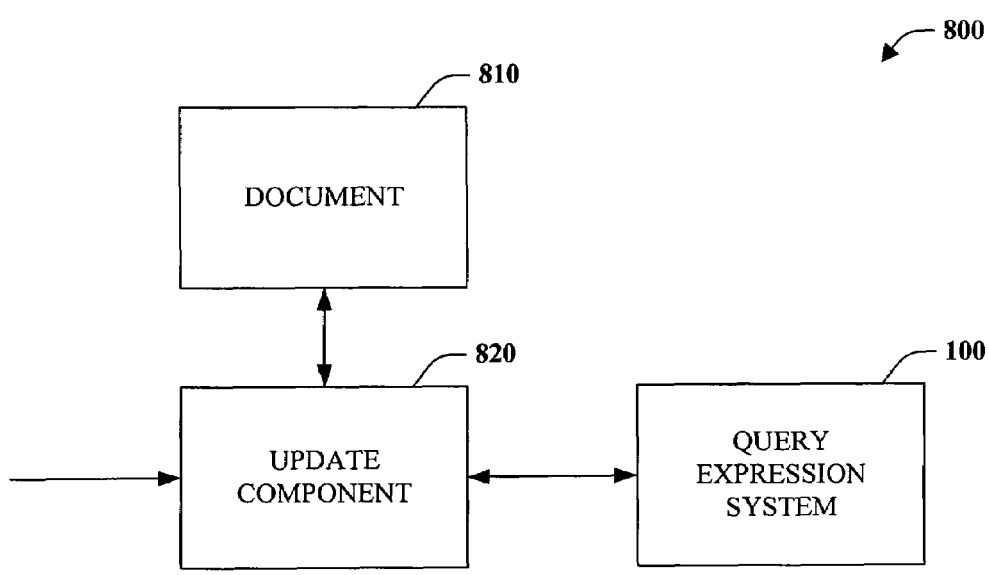
FIG. 8 is a block diagram of a document update system.

Turning to FIG. 8, a document update system 800 is illustrated. Document update system 800 includes document 810, update component 820, and query expression system 100. Document 810 can be an instance or collection of data based on a schema or format. Accordingly, document 810 can include an XML instance document and a relational database, among other things. Update component 820 provides a mechanism to update or otherwise modify document 810. It can support user input and allow manipulation of data in accordance with user commands. Update component 820 is communicatively coupled to and can interact with query expression system 100. Query expression system 100 as previously described receives and applies query expressions to associated metadata and produces an output. This output in some instances can be indicative of a resultant type of the expression, but it is not limited thereto. Prior to updating document 810, the update component 820 can invoke or engage query expression system 100 to determine if such an update is valid given an associated schema. Query expression system 100 can receive a query expression from the update component including a new element to be added, for instance, and can evaluate the expression with respect to a schema associated with the expression and the data domain queried. The query expression system 100 can then provide update component 820 with an indication of whether or not the update or modification to the document 810 is valid prior to applying it to the document.

By way of example and not limitation, system 800 can be employed to type check updates on an XML document before the update is applied instead of revalidating the document after the update has been applied. Prior to adding a new child element to a parent element and then discovering that the element is not a valid child, a path expression based on the current element name and the new child name can be built manually, automatically or semi-automatically and it can be provided to the query expression system 100 to check whether the XPath expression is valid. If it is not, then the update can be aborted even before it is applied. This results in a performance gain for updating XML as well as other documents.

Figure 9:
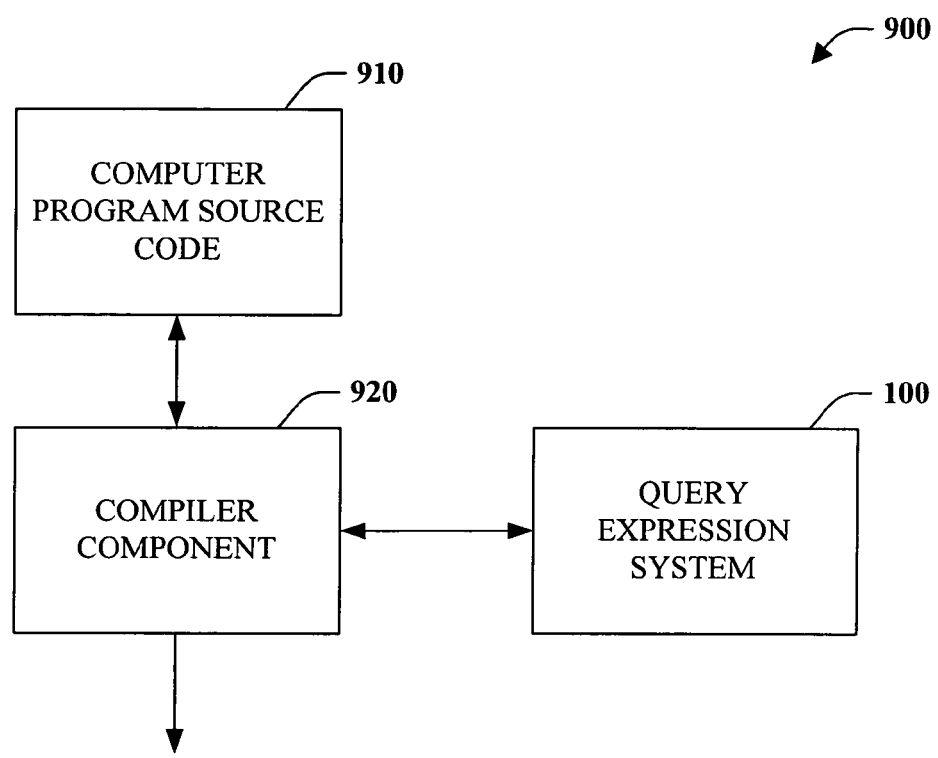
FIG. 9 is a block diagram of a program compilation system.

FIG. 9 illustrates a program compilation system 900 in accordance with an aspect of the subject invention. System 900 includes program source code 910, compiler component 920, and query expression system 100. Compiler component 920 receives, retrieves or otherwise obtains source code 910. Source code 910 provides high-level instructions to control a computer or other processor-based device. The compiler component 920 checks the source code 910 for errors and can subsequently generate machine code or intermediate language code that can be executed by a computer or virtual machine, thereby turning such a device into a specialized machine. In accordance with an aspect of the disclosed subject matter, compiler component 920 can communicate and interact with query expression system 100 to facilitate type checking of a program. Query expression system 100 can receive a query expression and metadata for example in the form of one or more schemas and evaluate the query expression based on the metadata. In this manner, the query expression can be type checked. Compiler component 920 can employ query expression system 100 to type check query expressions residing in source code 910. Furthermore, compiler component 920 can generate query expressions corresponding to elements therein and pass the expression to query expression system 100 to evaluate the type thereof.

The aforementioned systems have been described with respect to interaction between several components. It should be appreciated that such systems and components can include those components or sub-components specified therein, some of the specified components or sub-components, and/or additional components. For example, query engine component 120 can include evaluation component 210, output component 220, cache storage 310, and type inference component 410 or a combination thereof. Sub-components could also be implemented as components communicatively coupled to other components rather than included within parent components. Additionally, it should be noted that one or more components and/or sub-components may be combined into a single component providing aggregate functionality. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. For example, the query engine 120 or more specifically evaluation component 210 could utilize artificial intelligence, machine learning or like mechanisms to facilitate efficient evaluation of query expressions for instance in conjunction with cache storage 310. Still further yet, type inference component 410 can employ such methods or mechanism to infer types based on context.

In view of the exemplary systems described supra, methodologies that may be implemented in accordance with the disclosed subject matter will be better appreciated with reference to the flow charts of FIGS. 10-18. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media.

Figure 10:
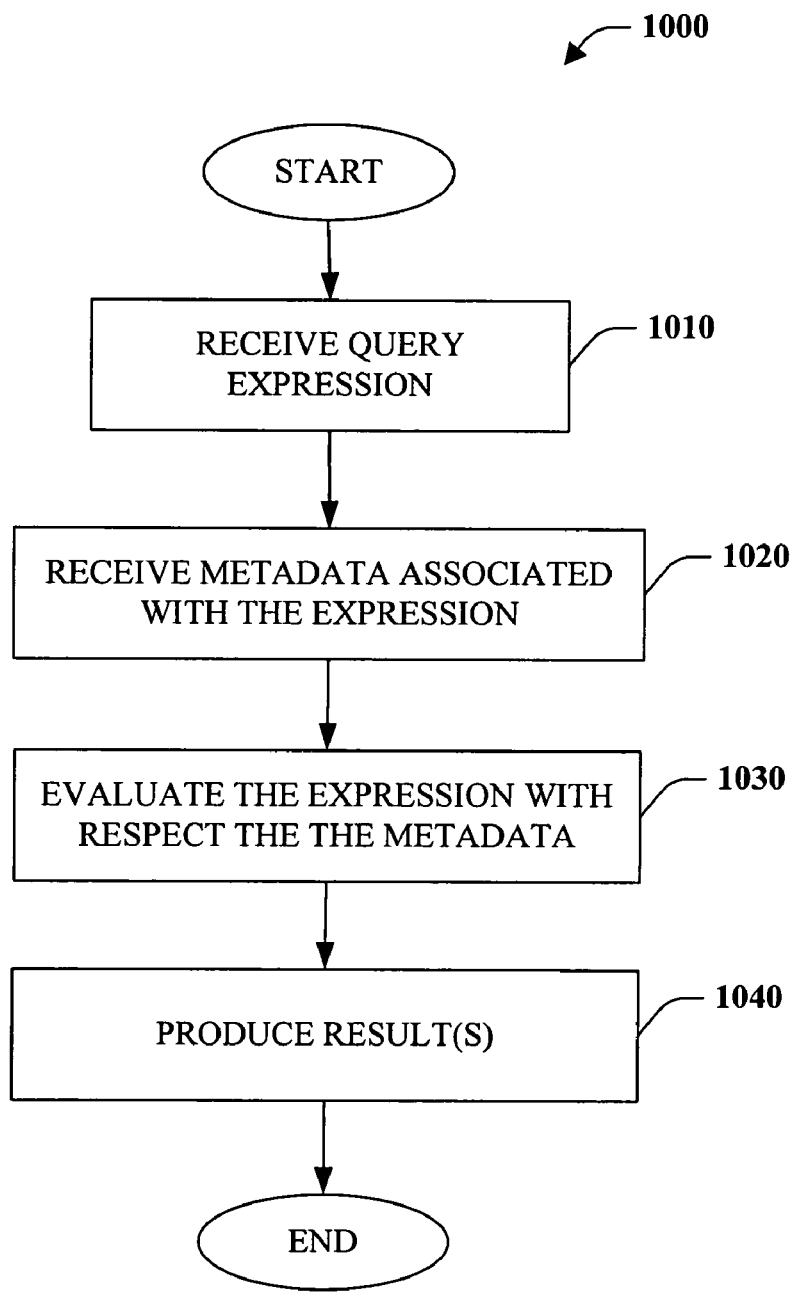
FIG. 10 is a flow chart diagram of a query expression interaction methodology.

Turning to FIG. 10, a query expression interaction methodology 1000 is depicted. At 1010, a query expression is received, retrieved or otherwise obtained. The query expression specifies particular data to be retrieved from a database or collection of data. For example, the query expression can correspond to a SQL query over relational data or an XPath expression over XML data, but it is not limited to these forms. At reference numeral 1020, metadata is received, retrieved or otherwise obtained. The metadata can pertain to the query expression and the domain to be queried or navigated. For instance, the metadata can be in the form of a schema or type definition, inter alia, that defines the structure, format, and/or type of the data. At 1030, the query expression is evaluated with respect to the metadata. At numeral 1040, results of the evaluation can be returned. Method 1000 thus provides a process for extracting information from the metadata or a schema representative thereof. Among other things, types and relationships amongst types, data elements and/or attributes can be retrieved.

Figure 11:
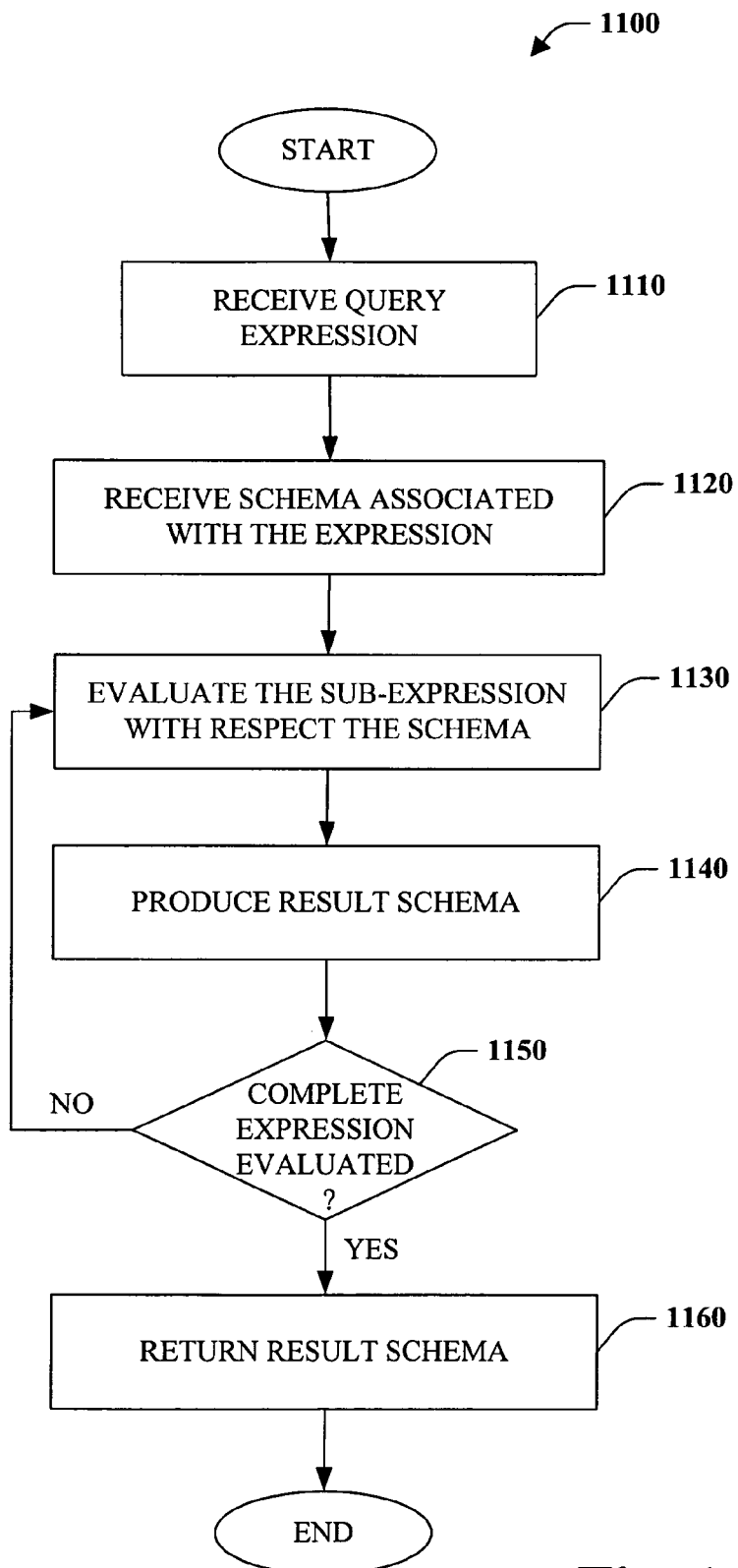
FIG. 11 is a flow chart diagram of a method of evaluating a query expression with respect to metadata.

FIG. 11 is a flow chart diagram of a method of evaluating query expressions with respect to metadata. At reference numeral 1110, a query expression is received, retrieved or otherwise obtained. The query expression represents some inquiry about data. Furthermore, the query expression can be complex meaning that includes a plurality of limitations or sub-expressions. At 1120, a schema is received, retrieved or otherwise obtained. The schema provides metadata about the data domain to which the query expression is directed. At 1130, a sub-expression is evaluated with respect to the schema. At 1140, results can be produced in a new result schema, perhaps filtered by the evaluation of the sub-expression. At 1150, a determination is made as to whether the complete expression has been evaluated. If the complete expression as been evaluated, the method can proceed to 1160 where the result schema can be returned. If there is more expression to evaluate, then the method proceeds to 1130, where the next sub-expression is evaluated with respect to the resultant schema. The method continues until all sub-expressions have been evaluated. Accordingly, method 1100 provides a manner of recursively applying schema to individual sub-expressions until the entire expression as been evaluated.

Figure 12:
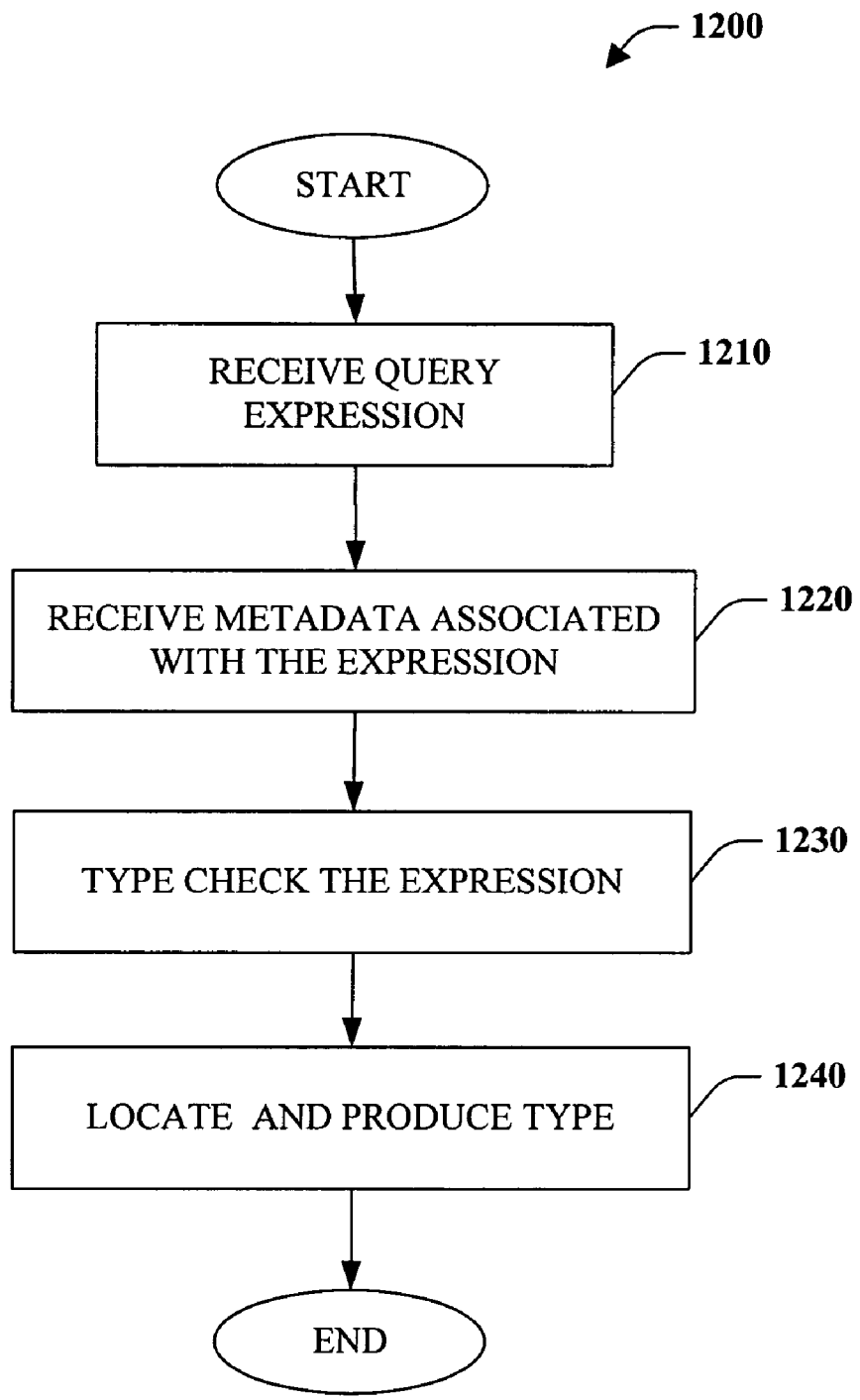
FIG. 12 is a flow chart diagram of a method of interacting with a query expression.

FIG. 12 illustrates a method 1200 of interacting with query expressions in accordance with an aspect of the disclosed subject matter. At reference numeral 1210, a query expression is received, retrieved or otherwise obtained. At 1220, metadata associated with the expression and a data domain to be queried is received, retrieved or otherwise obtained. At 1230, the expression is type checked with reference to the metadata. In other words, it is determined whether the expression is type correct. For instance, in an XPath expression it can be determined whether a path element and/or attribute exists by reference to the metadata. At reference numeral 1240, the type(s) associated with a valid query expression are retrieved from the metadata and produced.

Figure 13:
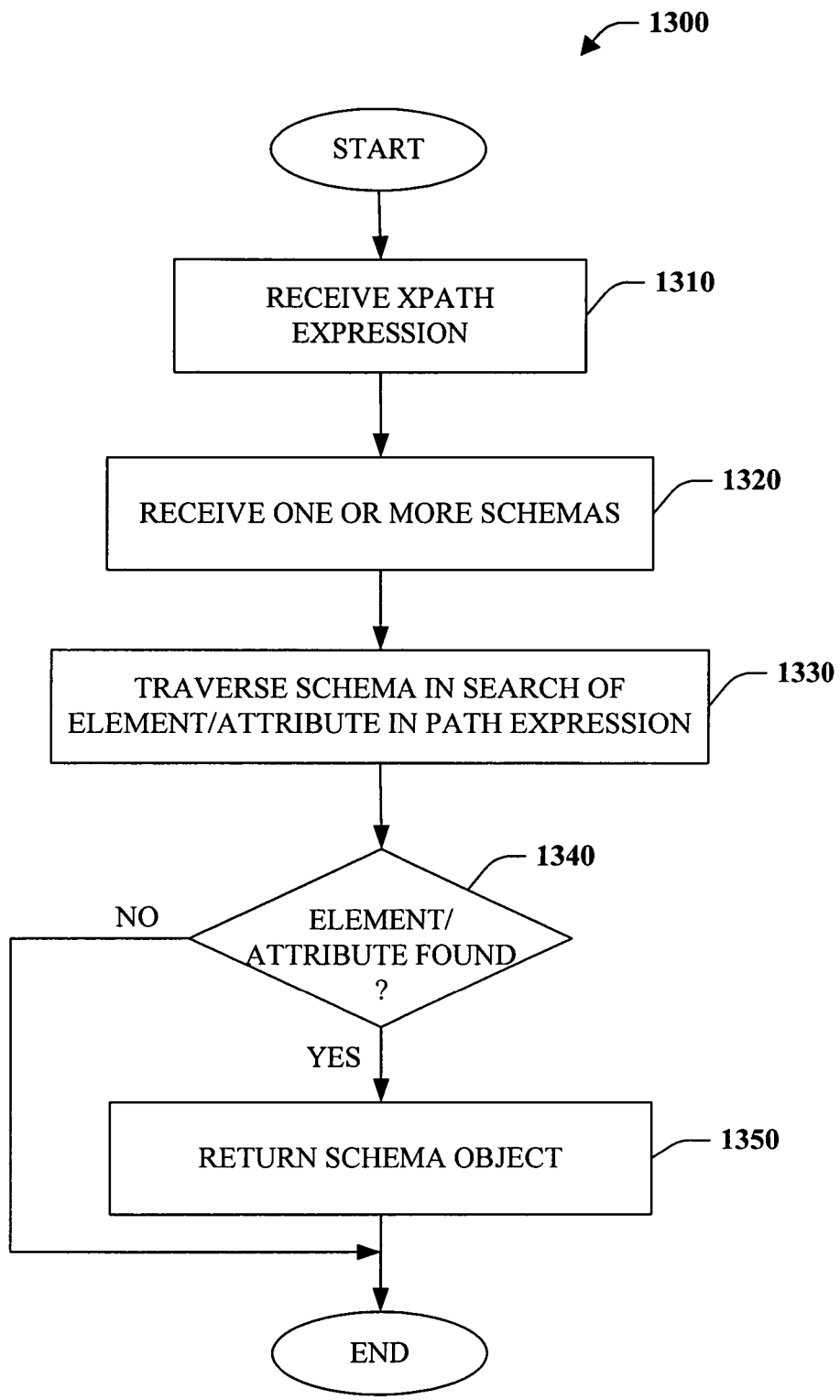
FIG. 13 is a flow chart diagram of a method of interaction with an XPath query expression.

Turning to FIG. 13, a flow chart diagram is provided illustrating a method 1300 for interacting with an XPath expression in accordance with an aspect of the subject innovation. At reference 1310, an XPath query or path expression is received, retrieved or otherwise obtained. At 1320, one or more schemas are received, retrieved, or otherwise obtained comprising metadata pertaining to the data to be navigated or queried. At 1330, the one or more schemas are traversed in search of an element and/or attribute specified by the path expression. At 1340, a check is made to determine if the element and/or attribute was able to be located. If yes, then at 1350 the resultant schema object can be produced, for example in a schema and the method terminates. If the element and/or attribute was not able to be located, then the method can simply terminate. Termination without production of a result object or schema can indicate that the element and/or attribute was not found. Alternatively, it should be appreciated that information or a message could be output to provide notification of the failure to locate the element and/or attribute.

Figure 14:
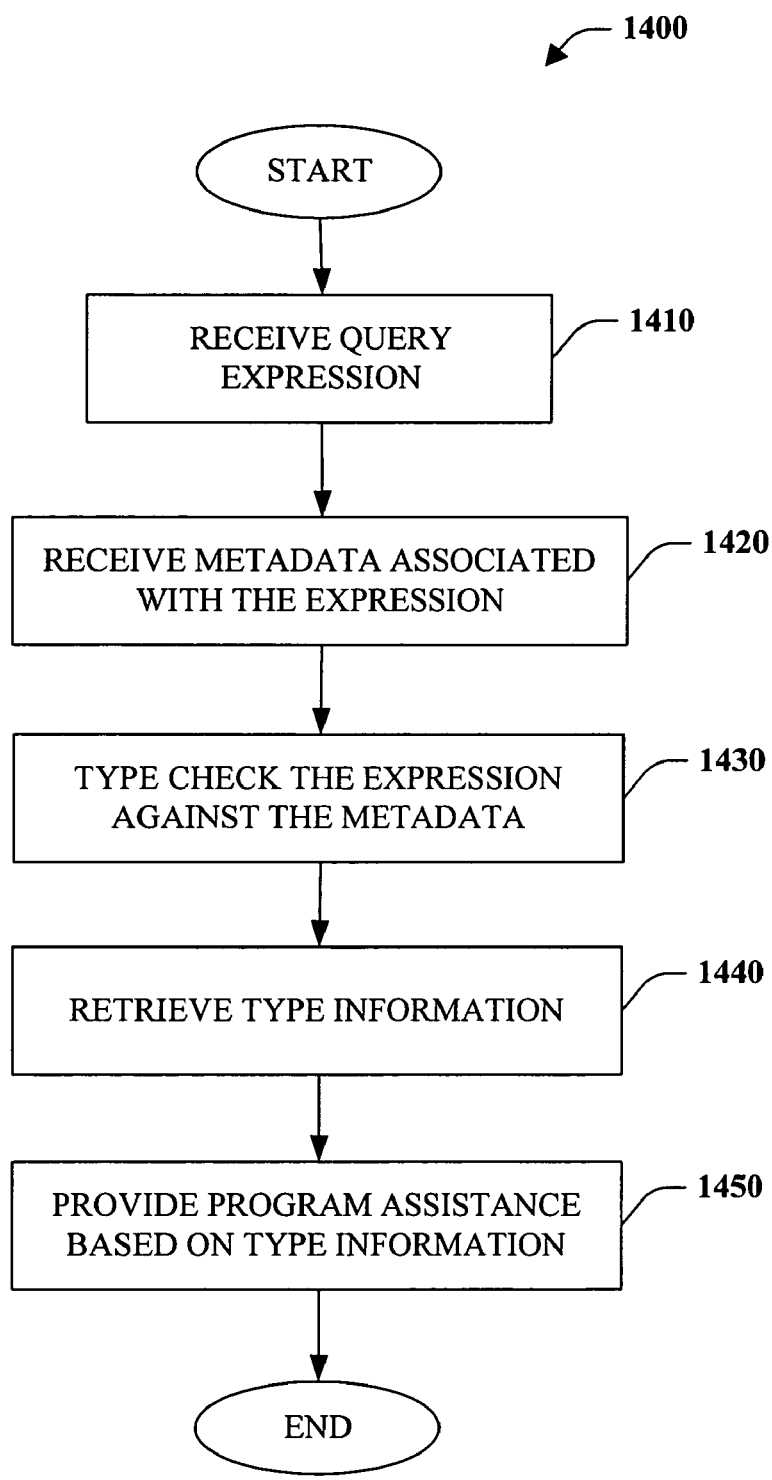
FIG. 14 is a flow chart diagram of a method of interacting with a query expression to provide context sensitive programmatic assistance.

FIG. 14 depicts a method 1400 for interacting with query expressions to provide context sensitive programmatic assistance. At reference numeral 1410, a query expression is received, retrieved or otherwise obtained. For example, the query expression could be provided by a code editor or programmatic assistance component associated therewith. At numeral 1420, metadata is received, retrieved or otherwise obtained. The metadata can be associated with the query expression and the domain to be queried and/or navigated. For instance, the query expression can correspond to an XPath path expression and the metadata can be provided by one or more XML schemas or schema definitions. At 1430, the query expression can be type checked against the metadata ensure it is a valid expression. At 1440, type information is retrieved for the expression from the metadata. The type information can correspond to the type of the query expression or any other metadata specified by the expression. At reference numeral 1450, program assistance can be supplied base on the type information. For example, a plurality elements can be provided in a drop down menu based on the type and/or context of previously entered code to facilitate automatic statement completion. Additionally or alternatively, type information can be supplied in tool tips upon hover of a cursor over an element or depression of a one or more select keys and/or errors or warnings can be provided.

Figure 15:
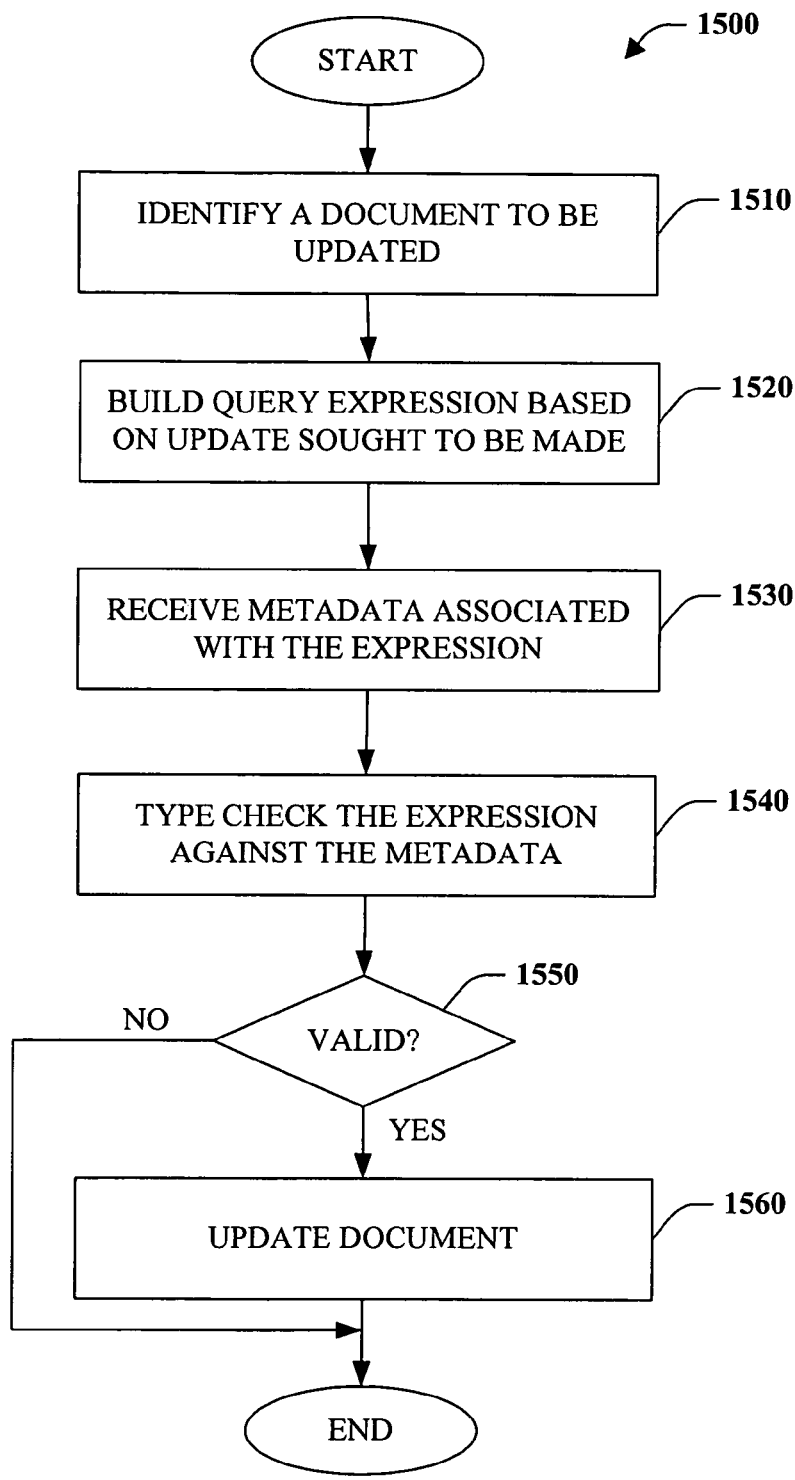
FIG. 15 is a flow chart diagram of a method of updating an instance document.

FIG. 15 illustrates a method of updating an instance document 1500 in accordance with an aspect of the disclosed subject matter. At reference numeral 1510, a document is identified for updating. This document can correspond to an instance document such as a relational database table or and XML instance document, among other things. At 1520, a query expression is built identifying a change to be made to the document. For example, if a new child element is sought to be added to a parent element, then an expression can be generated based on the parent element and the new child name. At 1530, metadata can be received, retrieved or otherwise obtained relating to the domain to be queried or navigated. In the XPath/XQuery realm, the metadata can be provided by one or more schemas or schema definition files. At numeral 1540, the build query expression is evaluated with respect to the metadata to type check the expression. At 1550, a determination is made as to whether the query expression is valid. If it is valid, then the alteration is valid and the document can be updated at 1560. If the expression is not valid, then the update is not valid and the method can terminate without updating the document.

Figure 16:
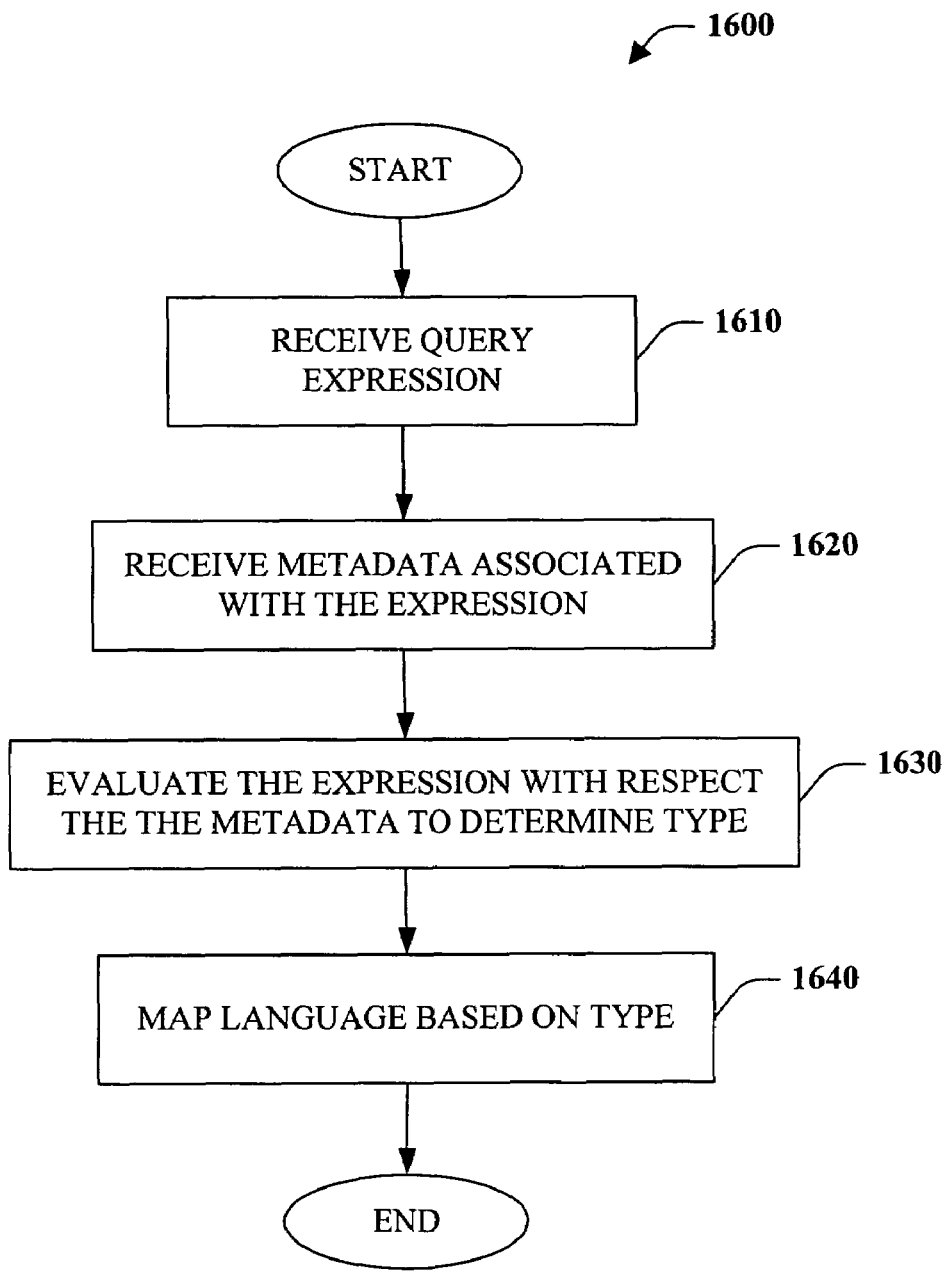
FIG. 16 is a flow chart diagram of a method of employing query expressions to facilitate language mapping.

FIG. 16 illustrates a method 1600 for employing query expressions to facilitate mapping. At 1610, a query expression is received, retrieved or otherwise obtained. At 1620, metadata associated with the expression and the domain to be queried or navigated is received, retrieved, or otherwise obtained. At 1630, the query expression is evaluated with respect to the metadata to determine the resultant type of the query expression. At 1640, a first language is mapped to a second language based on the type of the of the query expression, where the expression identifies an element in either the source or the target language. The mapping can map an element in a first language to an element of the same or similar type in a second language.

The following describes an exemplary implementation of aspects of the subject disclosure for purposes of clarity and understanding. The description is not meant to be limiting in any way as aspects of the subject disclosure can be captured, embodied and/or practice in a variety of different manners all which are considered to be with in the scope of the subject claims. In particular, the exemplary implementation is described with respect to XPath expressions and XML schemas. The subject disclosure and claims are not so limited.

Figure 17:
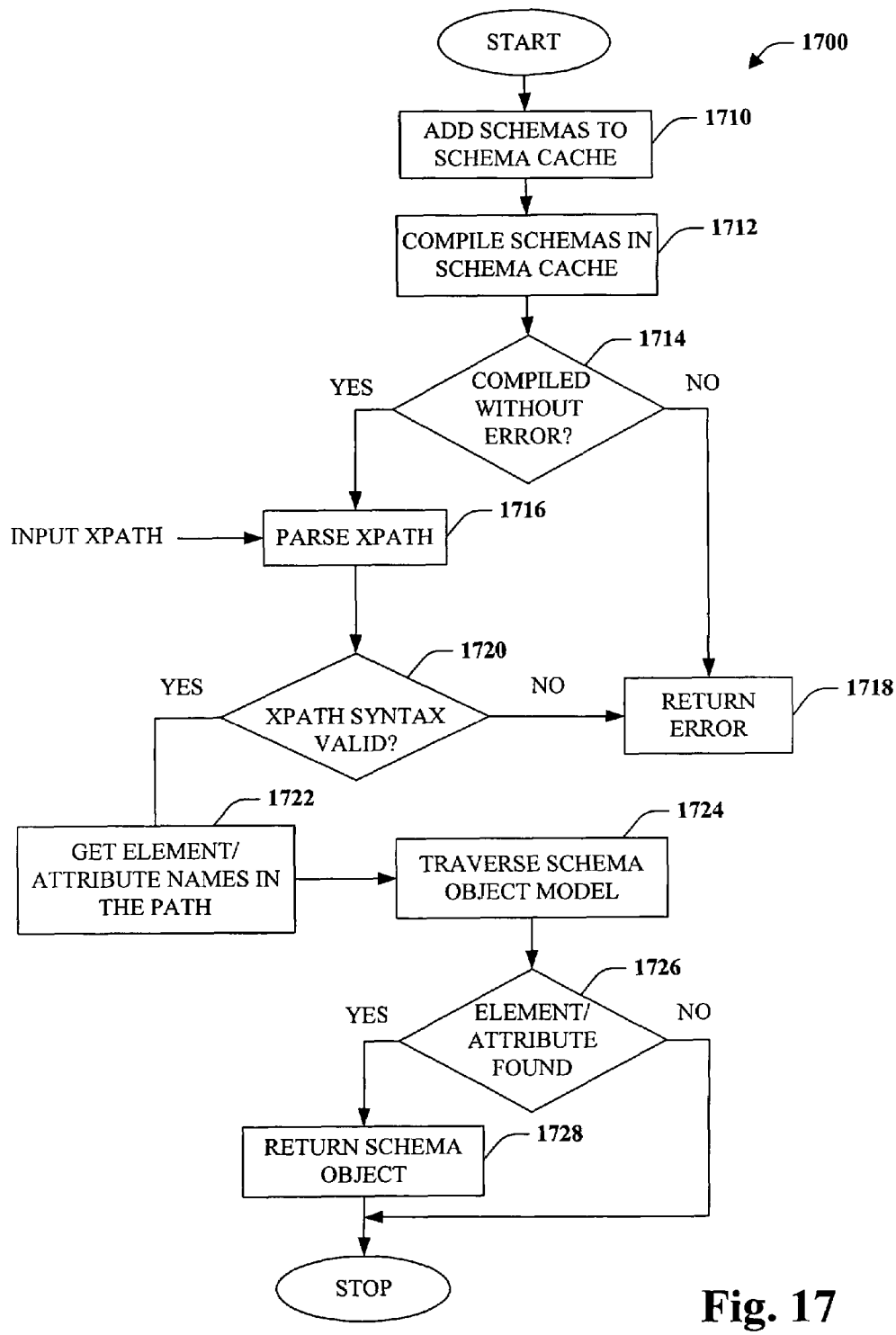
FIG. 17 is a flow chart diagram of an exemplary method of translating XPath to a corresponding XML schema element or attribute.

Turning to FIG. 17, a method 1700 of translating XPath to a corresponding XML schema element or attribute is illustrated. Schemas are provided to be type checked and at 1710, the one or more schemas are added to the schema cache. At reference numeral 1712, the schemas in the schema cache are compiled. At 1714, a determination is made as to whether the schemas compiled without error. If they compiled with error, then at 1718 and error is produced. If they did compile without error, then at 1716 an XPath query or path expression is received and parsed. The syntax of the expression is checked at 1720. If the syntax is not valid then an error is produced at 1718. If the syntax is valid, then at 1722 an attempt is made to retrieve the elements and/or attributes in the path expression. At 1724, the schema object model is traversed. The schema object model (SOM) can be a representation of the metadata of one or more schemas, for instance one that is easy to traverse. At 1726, a determination is made as to whether the element and/or attribute have been located. If the element/ attribute has been found then the schema object can be returned at 1728 and the method can terminate. Alternatively, if the element/attribute has not been found, then the method can simply terminate without returning results or provide a message indicating that the element/attribute was not found.

In accordance with a particular implementation, a parse routine is implemented to parse the grammar of the schema into a list of element/attribute names. The schema associated with the XPath query is loaded into a schema object model. Using the constructed element/attribute names, the schema object model can be traversed and the resultant XML schema object returned (e.g., XmlSchemaElement, XmlSchemaAny, XmlSchemaAttribute . . . ). By way of example, the code provided supra regarding the discussion of FIG. 1, can be rewritten as follows to invoke schema type checking:

```
XmlDocument doc = new XmlDocument( );
doc.Load("Customer.xml");
XmlElement rootElement = doc.DocumentElement;
XmlNamespaceManager nsManager = new XmlNamespaceManager(new
NameTable( ));
nsManager.AddNamespace("tns", "http://tempuri.org");
XmlSchemaSet set = new XmlSchemaSet( );
set.Add(null, "Customer.xsd");
XPathSchemaTypeChecker checker = new XPathSchemaTypeChecker(set,
nsManager);
XmlSchemaObject obj = checker.CheckType(xpath);
if (obj != null) {
  XmlNode customer = rootElement.SelectSingleNode(xpath, nsManager);
  Console.WriteLine("Customer: " + customer.InnerText);
}
else {
  Console.WriteLine("Input query will not generate any output");
}
```

Figure 18:
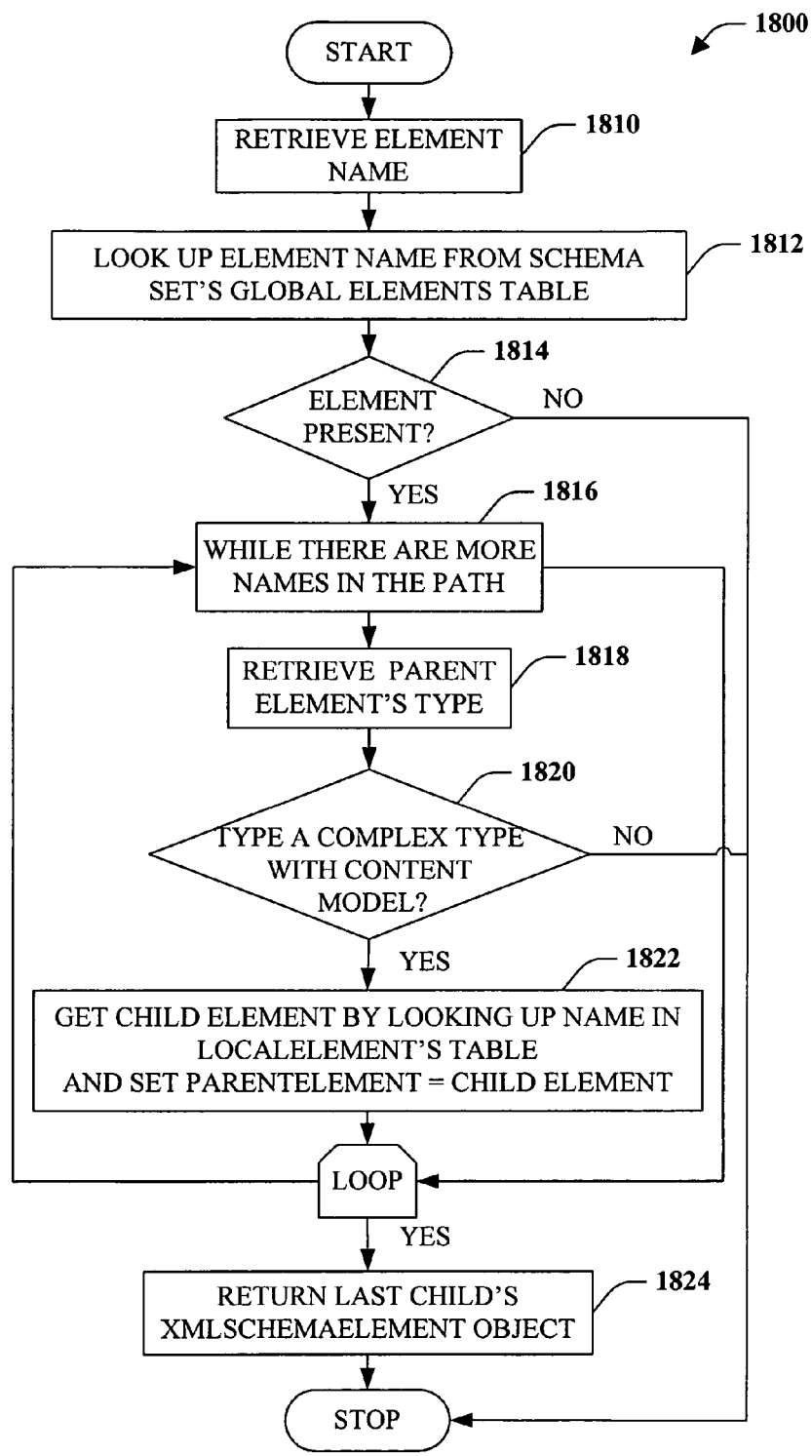
FIG. 18 is a flow chart diagram of an exemplary check type methodology.

The "CheckType" method 1800 on the "XPathSchemaTypeChecker" navigates the schema object model as depicted by FIG. 18. At 1810, an element name is retrieved from a parsed XPath query. At 1812, the element name is looked up from a schema set's global elements table. A check is made at 1814 as to whether the element is present in the elements table. If it is not the method terminates. If the element is present, the element proceeds to 1816, which continues to loop actions 1818 through 1822 while there are more names in the path. At 1818, the parent elements type is retrieved. At 1820, a determination is made as to whether the parent element's type is a complex type with content model. If no, then the method can terminate. If yes, then the child element is retrieved by looking up name in LocalElement's table and setting the parent element=child element. Once all the names in the path have been analyzed, the method can proceed to 1824, where the last child's XML schema element object is returned. The table below shows the results from the above code for different queries:

TABLE 1

| Query | Result |
|---|---|
| "/tns:Customer/tns:FirstName", "/tns:Customer/tns:Address" | Customer Name: Priya Input query will not generate any output |
| "/tns:Customer/@CustID" | Customer: 1 |
| "/tns:Customer/tns:FirstName/@CustID" | Input query will not generate any output |

It should also be appreciated that type checking can be performed on polymorphic XPath queries. Consider the following exemplary code:

```
<xs:schema xmlns:tns="http://tempuri.org"
    targetNamespace="http://tempuri.org"
    xmlns:xs="http://www.w3.org/2001/XMLSchema"
    elementFormDefault="qualified">
  <xs:element name="Bibliography">
    <xs:complexType>
      <xs:sequence>
        <xs:element ref="Publication" maxOccurs="unbounded" />
      </xs:sequence>
    </xs:complexType>
    <xs:element name="Publication" type="xs:anyType" abstract="true">
    <xs:element name="Book" type="tns:BookType"
        substitutionGroup="tns:Publication">
    <xs:element name="Magazine" type="tns:MagazineType"
        substitutionGroup="tns:Publication">
    <xs:complexType name="BookType">
      <xs:sequence>
        <xs:element name="Title" type="xs:string"/>
        <xs:element name="Author" type="xs:string"/>
      </xs:sequence>
    </xs:complexType>
    <xs:complexType name="MagazineType">
      <xs:sequence>
        <xs:element name="Title" type="xs:string"/>
        <xs:element name="Periodical" type="xs:string"/>
      </xs:sequence>
    </xs:complexType>
  </xs:element>
</xs:schema>
```

Now consider the following instance:

```
<Bibliography xmlns="http://tempuri.org" >
    <Book>
        <Title>Dune</Title>
        <Author>Frank Herbert</Author>
    </Book>
    <Magazine>
        <Title>eWeek</Title>
        <Periodical>Weekly</Periodical>
    </Magazine>
</Bibliography>
```

In the above schema, the "Publication" element is declared as an abstract element. Accordingly, it will be a validation error if this element appears in an instance. The "Magazine" and "Book" elements are members of the substitutionGroup of "Publication" meaning that they can appear in the instance wherever "Publication" can appear. Since "Publication" is abstract, one of "Magazine" or "Book" can only appear in the instance in its place. Based on the above, a type check query of "/tns:Bibliography/tns:Publication" should match either "Magazine" or "Book" children in the instance since either of these can substitute for the "Publication" element. As per the query "/tns:Bibliography/tns:Publication/tns:title" all titles should be retrieved including elements under "Magazine" and "Book" elements. Such type checking was not possible prior to the subject innovation as XPath conventionally is schema un-aware and works over only instance documents. Aspects of the disclosed subject matter now make it possible for an XML instance author to make use of such polymorphic features in XML schema including but not limited to element substitution, (e.g., via substitution groups) and type substitution (e.g., via xsi:type) and the XPath engine can make use of type checking to extend support for such polymorphic querying.

Figure 19:
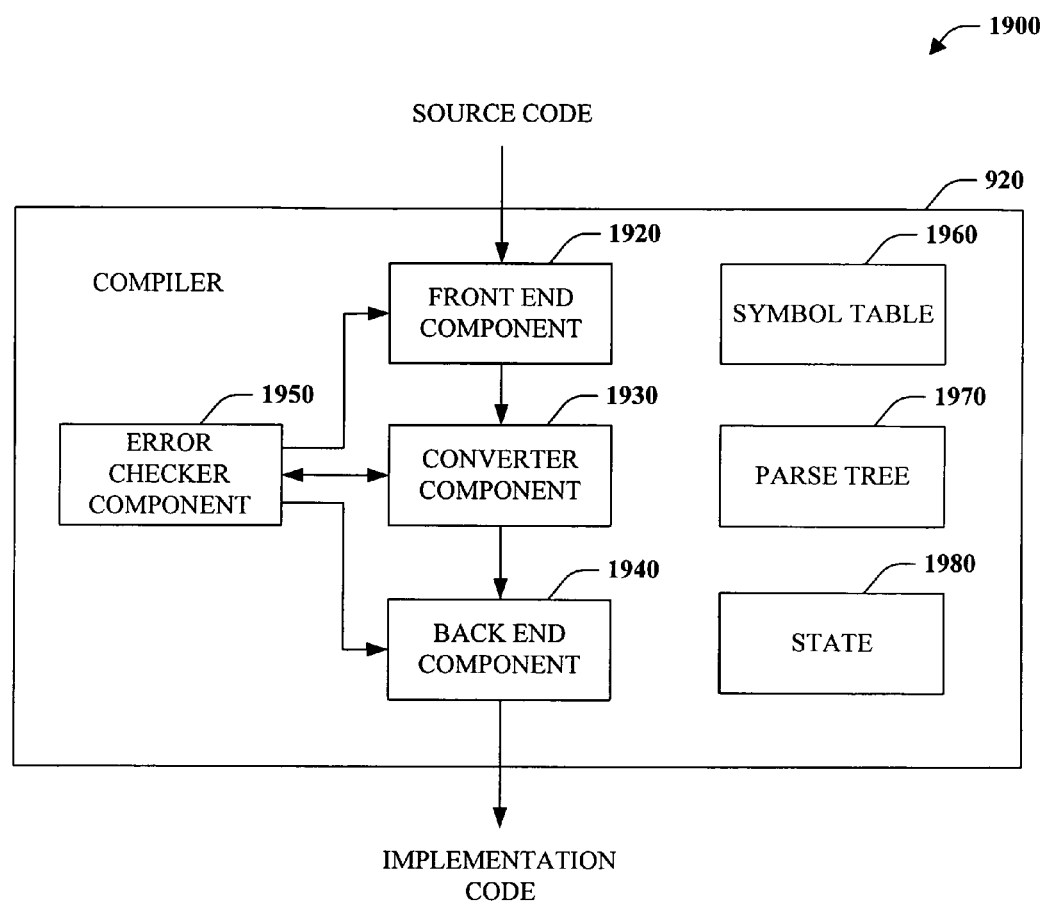
FIG. 19 is a schematic block diagram of a compilation environment.

FIG. 19 is a block diagram depicting a compiler environment 1900 that can be utilized to generate implementation code (e.g., executable, intermediate language . . . ). However, aspects of the environment can be employed by a background compiler, for instance related to a code editor, to enable intelligent or context sensitive programming assistance to be provided. The compiler environment 1900 includes a compiler 920 including front-end component 1920, converter component 1930, back-end component 1940, error checker component 1950, symbol table 1960, parse tree 1970, and state 1980. The compiler 920 accepts source code as input and produces implementation code as output. The input can include but is not limited to query expressions or elements capable of being identified by query expressions including but not limited to XPath/XQuery path expressions as described herein. The relationships amongst the components and modules of the compiler environment illustrate the main flow of data. Other components and relationships are not illustrated for the sake of clarity and simplicity. Depending on implementation, components can be added, omitted, split into multiple modules, combined with other modules, and/or other configurations of modules.

Compiler 920 can accept as input a file having source code associated with processing of a sequence of elements. The source code may include query expressions and associated functions, methods and/or other programmatic constructs. Compiler 920 may process source code in conjunction with one or more components for analyzing constructs and generating or injecting code.

A front-end component 1920 reads and performs lexical analysis upon the source code. In essence, the front-end component 1920 reads and translates a sequence of characters (e.g., alphanumeric) in the source code into syntactic elements or tokens, indicating constants, identifiers, operator symbols, keywords, and punctuation among other things.

Converter component 1930 parses the tokens into an intermediate representation. For instance, the converter component 1930 can check syntax and group tokens into expressions or other syntactic structures, which in turn coalesce into statement trees. Conceptually, these trees form a parse tree 1970. Furthermore and as appropriate, the converter module 1930 can place entries into a symbol table 1930 that lists symbol names and type information used in the source code along with related characteristics.

A state 1980 can be employed to track the progress of the compiler 920 in processing the received or retrieved source code and forming the parse tree 1970. For example, different state values indicate that the compiler 920 is at the start of a class definition or functions, has just declared a class member, or has completed an expression. As the compiler progresses, it continually updates the state 1980. The compiler 220 may partially or fully expose the state 1980 to an outside entity, which can then provide input to the compiler 920.

Based upon constructs or other signals in the source code (or if the opportunity is otherwise recognized), the converter component 1930 or another component can inject code corresponding to facilitate efficient and proper execution. Rules coded into the converter component 1930 or other component indicates what must be done to implement the desired functionality and identify locations where the code is to be injected or where other operations are to be carried out. Injected code typically includes added statements, metadata, or other elements at one or more locations, but this term can also include changing, deleting, or otherwise modifying existing source code. Injected code can be stored as one or more templates or in some other form. In addition, it should be appreciated that symbol table manipulations and parse tree transformations can take place.

Based on the symbol table 1960 and the parse tree 1970, a back-end component 1940 can translate the intermediate representation into output code. The back-end component 1940 converts the intermediate representation into instructions executable in or by a target processor, into memory allocations for variables, and so forth. The output code can be executable by a real processor, but the invention also contemplates output code that is executable by a virtual processor.

Furthermore, the front-end component 1920 and the back end component 1940 can perform additional functions, such as code optimization, and can perform the described operations as a single phase or in multiple phases. Various other aspects of the components of compiler 920 are conventional in nature and can be substituted with components performing equivalent functions. Additionally, at various stages during processing of the source code, an error checker component 1950 can check for errors such as errors in lexical structure, syntax errors, and even semantic errors. Upon detection error, checker component 1950 can halt compilation and generate a message indicative of the error.

Figure 20:
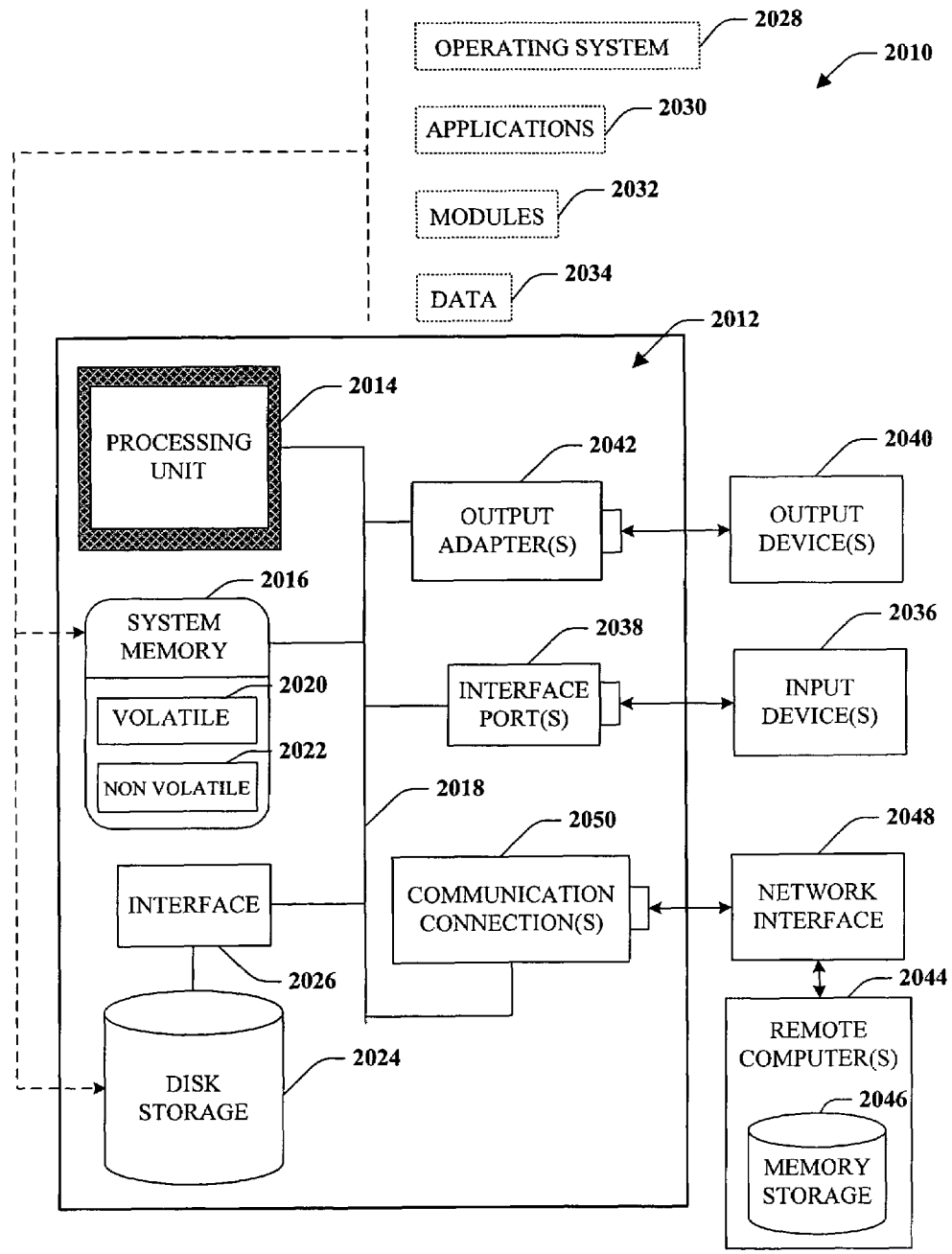
FIG. 20 is a schematic block diagram illustrating a suitable operating environment.
Figure 21:
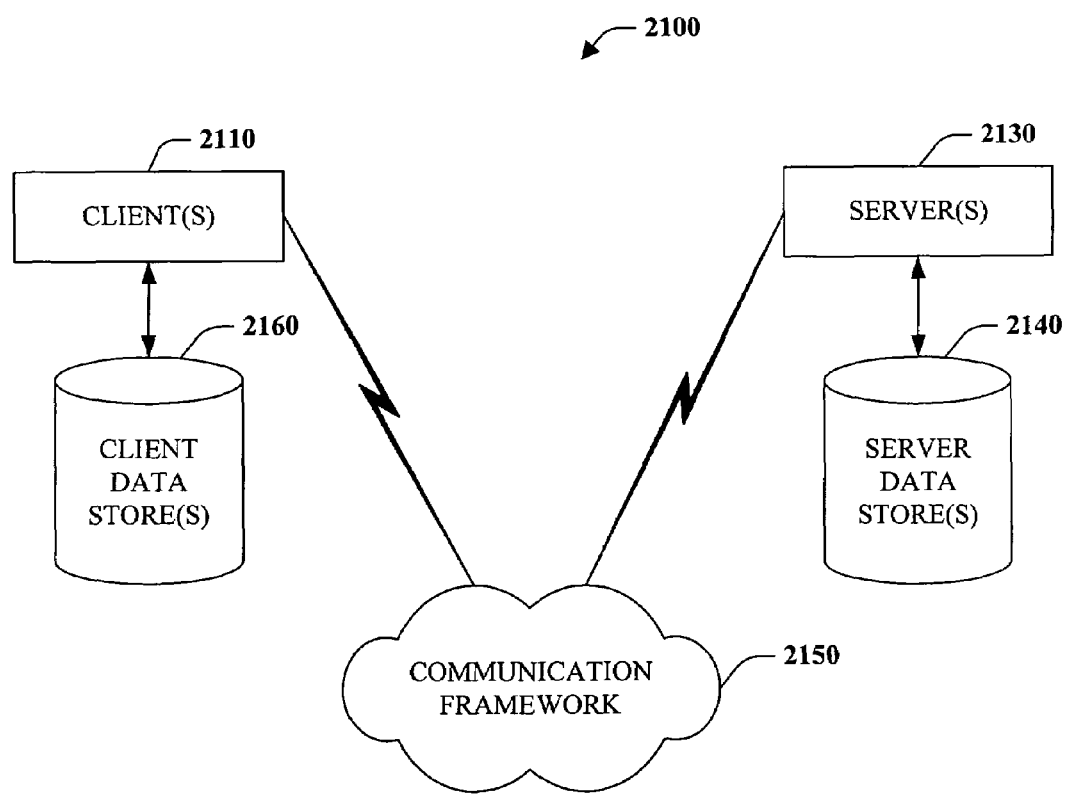
FIG. 21 is a schematic block diagram of a sample-computing environment.

In order to provide a context for the various aspects of the disclosed subject matter, FIGS. 20 and 21 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 20, an exemplary environment 2010 for implementing various aspects disclosed herein includes a computer 2012 (e.g., desktop, laptop, server, hand held, programmable consumer or industrial electronics . . . ). The computer 2012 includes a processing unit 2014, a system memory 2016, and a system bus 2018. The system bus 2018 couples system components including, but not limited to, the system memory 2016 to the processing unit 2014. The processing unit 2014 can be any of various available microprocessors. Dual microprocessors and other multiprocessor architectures also can be employed as the processing unit 2014.

The system bus 2018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 2016 includes volatile memory 2020 and nonvolatile memory 2022. The basic input/output system (BIOS), containing the basic routines to transfer information between elements within the computer 2012, such as during start-up, is stored in nonvolatile memory 2022. By way of illustration, and not limitation, nonvolatile memory 2022 can include read only memory (ROM), programmable ROM (PROM), electrically programmable ROM (EPROM), electrically erasable ROM (EEPROM), or flash memory. Volatile memory 2020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2012 also includes removable/non-removable, volatile/non-volatile computer storage media. FIG. 20 illustrates, for example, disk storage 2024. Disk storage 2024 includes, but is not limited to, devices like a magnetic disk drive, floppy disk drive, tape drive, Jaz drive, Zip drive, LS-100 drive, flash memory card, or memory stick. In addition, disk storage 2024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2024 to the system bus 2018, a removable or non-removable interface is typically used such as interface 2026.

It is to be appreciated that FIG. 20 describes software that acts as an intermediary between users and the basic computer resources described in suitable operating environment 2010. Such software includes an operating system 2028. Operating system 2028, which can be stored on disk storage 2024, acts to control and allocate resources of the computer system 2012. System applications 2030 take advantage of the management of resources by operating system 2028 through program modules 2032 and program data 2034 stored either in system memory 2016 or on disk storage 2024. It is to be appreciated that the present invention can be implemented with various operating systems or combinations of operating systems.

A user enters commands or information into the computer 2012 through input device(s) 2036. Input devices 2036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2014 through the system bus 2018 via interface port(s) 2038. Interface port(s) 2038 include, for example, a serial port, a parallel port, a game port, and a universal serial bus (USB). Output device(s) 2040 use some of the same type of ports as input device(s) 2036. Thus, for example, a USB port may be used to provide input to computer 2012 and to output information from computer 2012 to an output device 2040. Output adapter 2042 is provided to illustrate that there are some output devices 2040 like displays (e.g., flat panel and CRT), speakers, and printers, among other output devices 2040 that require special adapters. The output adapters 2042 include, by way of illustration and not limitation, video and sound cards that provide a means of connection between the output device 2040 and the system bus 2018. It should be noted that other devices and/or systems of devices provide both input and output capabilities such as remote computer(s) 2044.

Computer 2012 can operate in a networked environment using logical connections to one or more remote computers, such as remote computer(s) 2044. The remote computer(s) 2044 can be a personal computer, a server, a router, a network PC, a workstation, a microprocessor based appliance, a peer device or other common network node and the like, and typically includes many or all of the elements described relative to computer 2012. For purposes of brevity, only a memory storage device 2046 is illustrated with remote computer(s) 2044. Remote computer(s) 2044 is logically connected to computer 2012 through a network interface 2048 and then physically connected via communication connection 2050. Network interface 2048 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 2050 refers to the hardware/software employed to connect the network interface 2048 to the bus 2018. While communication connection 2050 is shown for illustrative clarity inside computer 2012, it can also be external to computer 2012. The hardware/software necessary for connection to the network interface 2048 includes, for exemplary purposes only, internal and external technologies such as, modems including regular telephone grade modems, cable modems, power modems and DSL modems, ISDN adapters, and Ethernet cards or components.

FIG. 21 is a schematic block diagram of a sample-computing environment 2100 with which the present invention can interact. The system 2100 includes one or more client(s) 2110. The client(s) 2110 can be hardware and/or software (e.g., threads, processes, computing devices). The system 2100 also includes one or more server(s) 2130. Thus, system 2100 can correspond to a two-tier client server model or a multi-tier model (e.g., client, middle tier server, data server), amongst other models. The server(s) 2130 can also be hardware and/or software (e.g., threads, processes, computing devices). The servers 2130 can house threads to perform transformations by employing the present invention, for example. One possible communication between a client 2110 and a server 2130 may be in the form of a data packet adapted to be transmitted between two or more computer processes.

The system 2100 includes a communication framework 2150 that can be employed to facilitate communications between the client(s) 2110 and the server(s) 2130. The client(s) 2110 are operatively connected to one or more client data store(s) 2160 that can be employed to store information local to the client(s) 2110. Similarly, the server(s) 2130 are operatively connected to one or more server data store(s) 2140 that can be employed to store information local to the servers 2130.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations thereof are used in either the detailed description or the claims, such terms are intended to be inclusive in a manner similar to the term "comprising" as "comprising" is interpreted when employed as a transitional word in a claim.

What is claimed is:

1. A computer-implemented query expression system comprising the following computer executable components:
   a receiver component that receives a query expression and metadata that pertains to the query expression and a domain, wherein the domain represents at least one of a database or a document, or a combination thereof, comprising data and the metadata is associated with the data and the domain;
   a query engine that applies the query expression to the metadata, retrieves information that corresponds to a type of result that would be returned if the query expression were executed on the data, and provides results based in part on the retrieved information to facilitate at least one of computer program generation, program compilation, generation of a language map, or document updates, or a combination thereof; and
   an update component, in conjunction with the query engine, determines prior to updating the data of the domain whether a proposed update contained in the query expression is valid based at least in part on the proposed update and domain type, and if the proposed update is valid, facilitates updating the domain content.

2. The system of claim 1, the results provide an indication of expression validity.

3. The system of claim 2, the query engine outputs expression type information when the expression is valid.

4. The system of claim 1, the expression is an XPath/XQuery expression and the metadata is provided in the form of one or more XML schemas or type definition documents, or a combination thereof.

5. The system of claim 1, the query engine includes an evaluation component that determines a resultant type of the expression.

6. The system of claim 5, the query engine including an output generation component that outputs the resultant type of the expression.

7. The system of claim 6, further comprising a cache store that houses expressions and their resultant types to facilitate expeditious lookup by the query engine in lieu of reapplication of the expression to the metadata.

8. The system of claim 6, further comprising a compiler that employs the resultant type to type check a computer program.

9. The system of claim 6, further comprising a map component that receives the type of a programmatic element identified by the query expression and translates the element to a type in an alternate language.

10. The system of claim 1, further comprising a program assistance component that receives and employs expression type information supplied by the query engine to provide programmatic support including at least one of automatic statement completion, tool tips, error detection, or error notification, or a combination thereof.

11. The system of claim 1, the query expression is the same expression employed to retrieve instance data.

12. A computer-implemented query analysis system, comprising:
   means for receiving a query expression and metadata of a domain to be queried or navigated, wherein the domain represents at least one of a database or a document, or a combination thereof, comprising data and the metadata is associated with the data and the domain;
   means for executing the query expression on the metadata and extracting information that corresponds to a type of result that would be returned if the query expression were executed on data associated with the domain to facilitate at least one of computer program generation, program compilation, generation of a language map, or document updates, or a combination thereof;
   means for determining if a modification of a domain proposed in the query expression is valid prior to modifying the domain based at least in part on the proposed modification and domain type; and
   means for modifying the domain based at least in part on the proposed modification if the proposed modification is valid.

13. The system of claim 12, the query expression is an XPath expression and the metadata is specified within one or more received schemas.

14. A computer-implemented method of query expression interaction comprising the following computer executable acts:
   receiving a query expression and metadata associated with the expression, the metadata is associated with data in a domain;
   applying the expression to the metadata;
   retrieving information that corresponds to a type of result that would be returned if the query expression were executed on the data;
   determining if the query expression contains a request to update data in the domain,
   determining if the update request is valid prior to updating the domain based at least in part on the requested update and domain type to facilitate updating data in the domain;
   generating results based in part on the retrieved information to facilitate at least one of computer program generation, program compilation, generation of a language map, or document updates, or a combination thereof, and
   caching the query expression and the generated results to facilitate lookup and retrieval of the generated results in lieu of reapplying the query expression to the metadata.

15. The method of claim 14, receiving a query expression comprises receiving an XPath expression.

16. The method of claim 15, receiving metadata comprises receiving one or more schemas.

17. The method of claim 16, generating results comprises producing an XML schema including a resultant type of the expression.

18. The method of claim 17, further comprising providing programmatic support based in part on the resultant type of the expression including at least one of automatic statement completion, tool tips, or error notification, or a combination thereof.

19. The method of claim 17, further comprising mapping the resultant type to another language type.

20. The method of claim 17, further comprising modifying an instance document when the query expression represents a proposed modification to the document and a resultant type is returned indicating the query expression and the modification represented thereby are valid.

* * * * *